United States Patent
Bozano

(10) Patent No.: US 8,093,743 B2
(45) Date of Patent: Jan. 10, 2012

(54) PLANT FOR THE PRODUCTION OF ELECTRIC POWER FROM THE MOVEMENT OF WAVES

(76) Inventor: Enrico Bozano, Genoa (IT)

( * ) Notice: Subject to any disclaimer, the term of this patent is extended or adjusted under 35 U.S.C. 154(b) by 335 days.

(21) Appl. No.: 12/304,355

(22) PCT Filed: Jun. 14, 2007

(86) PCT No.: PCT/EP2007/055903
§ 371 (c)(1),
(2), (4) Date: Dec. 11, 2008

(87) PCT Pub. No.: WO2007/144407
PCT Pub. Date: Dec. 21, 2007

(65) Prior Publication Data
US 2009/0250934 A1    Oct. 8, 2009

(30) Foreign Application Priority Data
Jun. 16, 2006   (IT) ................................ GE2006A0064

(51) Int. Cl.
*F03B 13/18* (2006.01)
(52) U.S. Cl. ................ 290/53; 60/398; 405/78; 417/333
(58) Field of Classification Search ............... 290/42–43, 290/53–54; 60/495–500, 502, 698; 405/75–76, 405/78
See application file for complete search history.

(56) References Cited

U.S. PATENT DOCUMENTS

| | | | |
|---|---|---|---|
| 2,848,189 A | | 8/1958 | Caloia |
| 3,487,228 A | | 12/1969 | Kriegel |
| 3,952,517 A | * | 4/1976 | Decker .......................... 60/502 |
| 3,970,415 A | * | 7/1976 | Widecrantz et al. .......... 417/332 |
| 4,208,878 A | * | 6/1980 | Rainey ............................ 60/496 |
| 4,563,591 A | * | 1/1986 | Jones ............................... 290/53 |
| 4,754,157 A | * | 6/1988 | Windle ............................ 290/53 |
| 4,794,544 A | * | 12/1988 | Albright et al. ............... 700/287 |
| 4,883,411 A | | 11/1989 | Windle |
| 5,027,000 A | * | 6/1991 | Chino et al. ..................... 290/53 |
| 5,186,822 A | * | 2/1993 | Tzong et al. ................... 210/122 |
| 5,701,740 A | * | 12/1997 | Tveter ............................. 60/505 |
| 6,388,342 B1 | | 5/2002 | Vetterick et al. |
| 7,735,317 B2 | * | 6/2010 | Welch, Jr. ....................... 60/398 |

FOREIGN PATENT DOCUMENTS

| | | |
|---|---|---|
| EP | 1 045 138 | 10/2000 |
| FR | 530 941 | 1/1922 |
| FR | 2 860 270 | 4/2005 |
| GB | 655 987 | 8/1951 |

* cited by examiner

*Primary Examiner* — Michael Zarroli
(74) *Attorney, Agent, or Firm* — Stites & Harbison PLLC; Marvin Petry

(57) ABSTRACT

A plant for producing electrical power from the movement of waves. An offshore dam has a fixed generally vertical surface which is located in open water having wave movement and located vertically at the water surface. A submerged part which is fixed relative to the dam has an opening below the waves and in close proximity to the plane of the vertical surface to receive sea water. A force exerting structure such as a hydraulic pump or a thrust arrangement receives the water through the opening and forces that water through a one-way valve beyond which it is led to a turbine for producing electric power.

21 Claims, 7 Drawing Sheets

PLANT FOR THE PRODUCTION OF ELECTRIC POWER FROM THE MOVEMENT OF WAVES

FIELD OF THE INVENTION

The present invention relates to a plant for producing electric power from the movement of waves.

BACKGROUND OF THE INVENTION

As is known, at present various systems for producing electric power from the movement of waves are known, said systems, for example, being able to make use of the fluctuating movements of sea waves in order to operate devices which are situated, for example, on a wall against which these waves suitably connected to electric power generators collide. Another type of system for obtaining power from the movement of waves consists in complex apparatus provided with buoys anchored to the seabed and completely submerged: the continuous motion of the waves imparts a continuous movement to these buoys which are anchored to the seabed and which in turn are connected to floating cylinders co-operating with actuator means connected to electric generators. The principle of these systems is therefore essentially that of causing the movement of a piston, which may also be an oscillating water column, inside a chamber under the continuous action of the wave movement and transferring this movement, in a manner which is entirely known, to an electric power generator.

These systems, however, have often proved to be very complex to produce and their efficiency does not achieve fully satisfactory results.

SUMMARY OF THE INVENTION

The object of the present invention is therefore to provide a plant for producing electric power which is economically advantageous, which is simple in terms of its constructional design and which ensures an optimum operating efficiency.

This object is achieved by the present invention by means of a plant for producing electric power from the movement of waves, characterized in that it comprises an offshore dam for separating a section of sea inside it, such as a port zone, from an open-sea section and comprising towards this open-sea section a submerged part which has, formed therein, one or more ducts and/or inlets for receiving the water, provided upstream and/or downstream with non-return valve means; at least one turbine connected to electric power generating means is positioned in this offshore dam or in a land zone also at a distance from this offshore dam; this turbine is connected upstream to at least one water supply duct in turn connected upstream to a force exerting structure such as a suitable pumping means or thrust means able to convey the water received via these ducts and/or inlets towards this duct for supplying water to this turbine.

BRIEF DESCRIPTION OF THE DRAWINGS

Further characteristic features and advantages of the present invention will be better understood during the course of the following description provided purely by way of a non-limiting example with reference to the accompanying drawings in which.

DETAILED DESCRIPTION OF THE INVENTION

Figure 1:
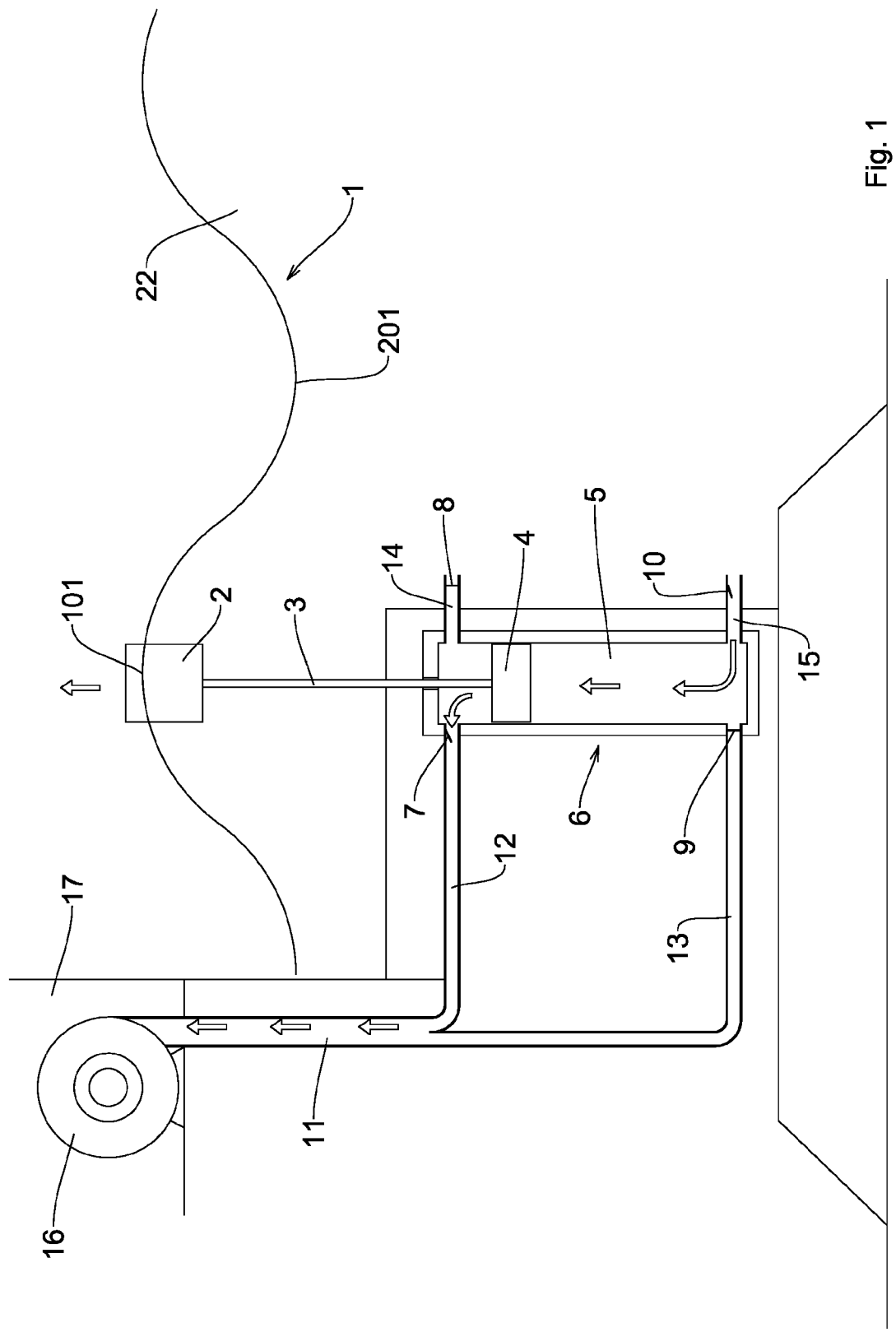
FIG. 1 shows a first side elevation view of a first embodiment of the present plant for producing electric power from the movement of waves, comprising a float shown schematically on a crest of a sea wave and a hydraulic pump which directs water to a turbine connected to an alternator and housed on an offshore dam.

With reference to the accompanying drawings and with particular reference to FIG. 1 thereof, 1 denotes schematically a sea wave which is formed by a series of crests 101 and troughs 201. 2 denotes a float connected to a hydraulic pump 6 housed inside an offshore dam 17 and containing a piston 4 movable vertically inside a cylinder 5. A rod 3 emerges from this cylinder at the top and connects said piston 4 to said float 2. The hydraulic pump 6 is connected moreover to a series of ducts 12, 13, 14, 15 into which the water flows in given directions depending on opening or closing of a series of four non-return valves 7, 8, 9 and 10. These ducts are formed inside the offshore dam 17 on which a turbine 16 connected to an alternator for producing electric power is positioned. The ducts 12 and 13 are connected to duct 11 for supplying the water to the turbine 16 and connected to a cylinder 5, while the ducts 14 and 15 are connected to this cylinder 5 and water from an open-sea section 22 is conveyed inside them. This turbine 16 and this alternator may also be situated in a land location close to a shoreline; in this case the supply duct 11 must have a certain length and must have suitable dimensions since the hydraulic pump 6 and the float must be positioned in any case where the wave movement has a certain intensity. The valve 7 is provided upstream of the duct 12, situated on one side close to the top of the cylinder 5 and shown in an open position, while the valve 8 is provided upstream of the duct 14, being shown in the closed position. This duct 14, at the opposite end to the valve 8, is connected to the cylinder 5 close to the top thereof, on the opposite side to the duct 12 and substantially at the same height with respect to the latter. The duct 13 is connected to the cylinder 5, close to the base of the latter and has upstream the valve 9, shown in the closed position. The duct 15 is positioned on the opposite side of the cylinder to said duct 13, substantially at the same height and therefore close to the base of said cylinder 5, and has upstream a valve 10 shown in the open position.

Figure 2:
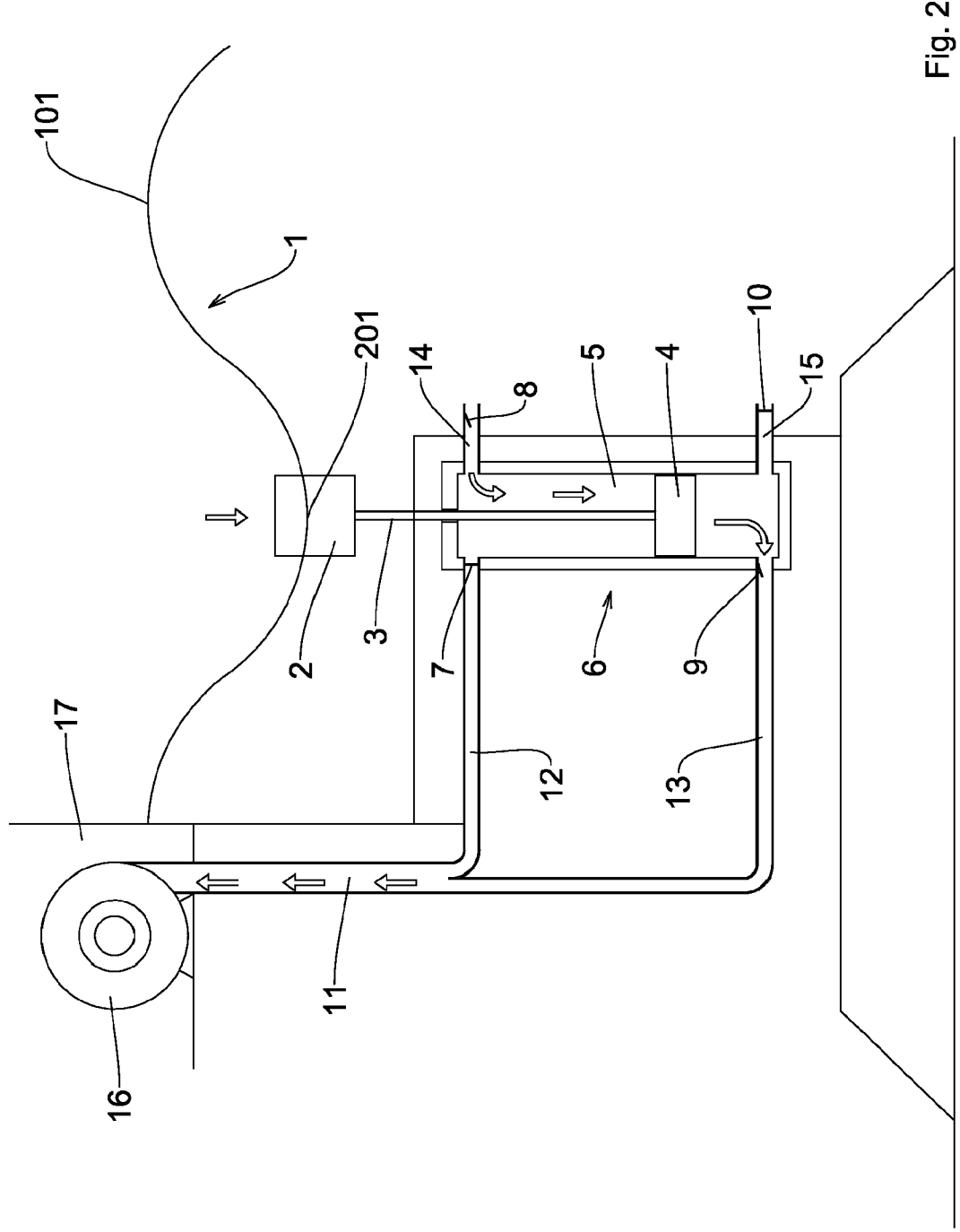
FIG. 2 shows a second side elevation view of this first embodiment of the plant according to FIG. 1, with the float shown schematically in a trough of a sea wave.

In the figure, the float 2 of the present plant, according to this first embodiment of the invention, is situated at the top of a crest 101 of the sea wave 1: the piston 4, joined to this float 2 by means of the rod 3, will have therefore performed a movement from the bottom upwards inside the cylinder 5 in order to reach the position shown, causing opening of the valve 10 which allows the entry of a certain amount of water through the duct 15 inside this cylinder 5 into the zone underneath this piston 4. After completion of the rising movement of the float 2 as far as the crest 101 of the wave 1, and therefore the piston 4 into the vicinity of the cylinder 5, the descending movement of this float will start, as can be seen in FIG. 2 of the accompanying drawings, until it reaches the trough 201 of this wave 1. During the downward movement the float 2 will push the piston 4 downwards so that it reaches, in the region of the trough 201 of the wave 1, a position close to the bottom of the cylinder 5. During the downward movement this piston 4 pushes the water introduced into the cylinder 5 in the manner described with reference to FIG. 1 and therefore the valve 9 will open and the valve 10 will close, and the water will flow out from the duct 13 so as to reach the supply duct 11 and therefore the turbine 16. At the same time the downward movement of the piston 4 causes the entry of a certain quantity of water from the duct 14 which is positioned at the top on one side of the cylinder 5 and therefore the valve 8 will open and the valve 7 will close. This quantity of water, which in this case is collected above the top part of the piston 4, will be directed towards the supply duct 11 in the manner shown in FIG. 1 upon rising again of said piston 4 and therefore through the open valve 7 and the duct 12.

Obviously, a series of the plants described above may be arranged along the offshore dam 17 and it is also possible to envisage several hydraulic pumps 6 in series so as to optimize further the efficiency of the plant and be able to reach a predetermined power. The present plant may also use the waste water in order to decontaminate the internal water of the port.

Figure 3:
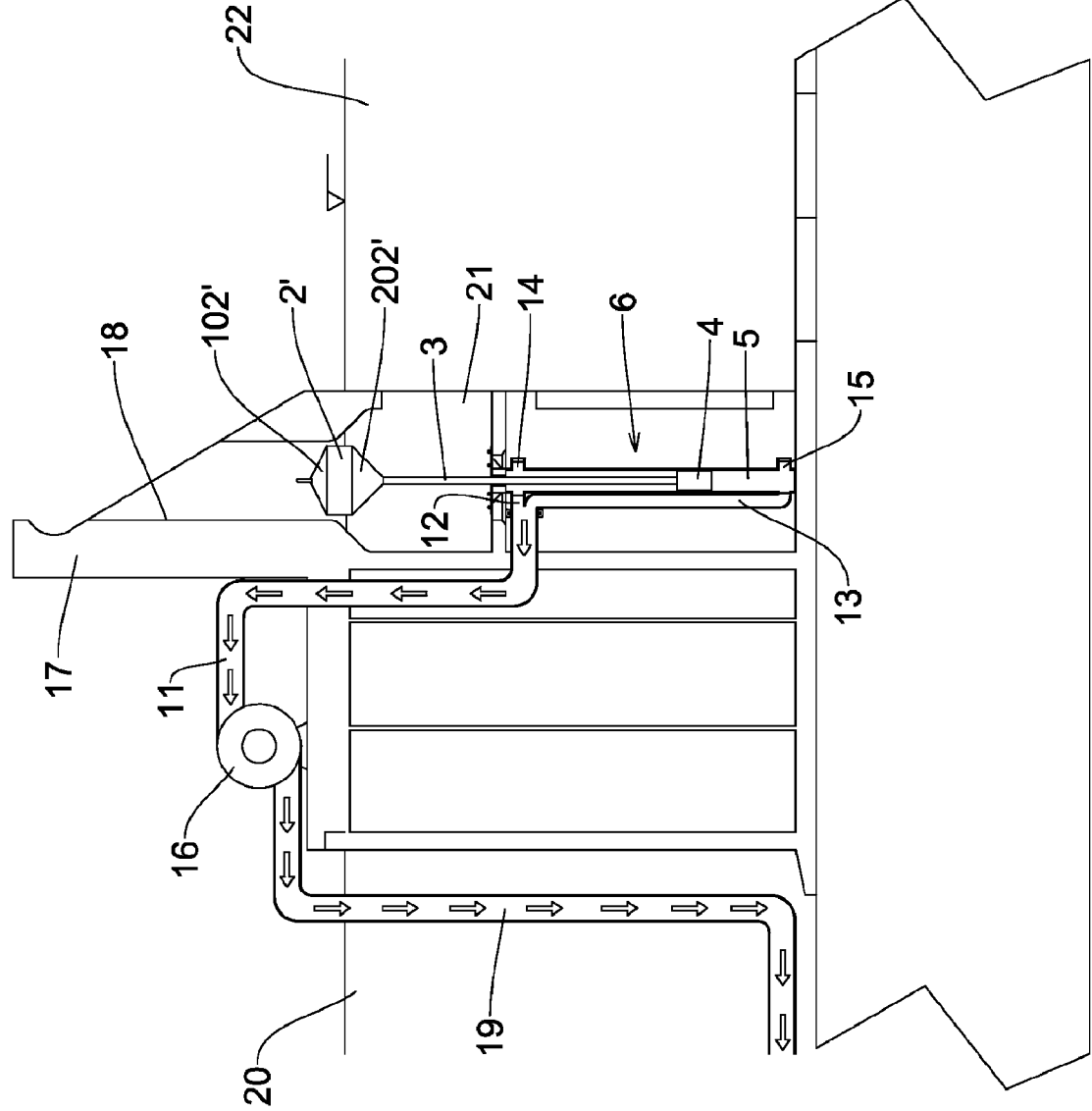
FIG. 3 shows a side elevation view of a second embodiment of the present invention in which the plant comprises a duct for recirculating the water used in a turbine.

FIG. 3 shows a second embodiment of the present plant. In this case the offshore dam 17 comprises a seat 18, which is preferably cylindrical, inside which the float 2' may slide, said float, as can be seen, having an upper section 102' and a lower section 202' which are substantially conical or frustoconical, so as to facilitate the upward and downward movement thereof, also in the case of sea waves of smaller amplitude. Underneath this float 2', the offshore dam 17 has, formed therein, an expansion chamber 21 for the incoming sea wave, which communicates with the section 22 of seawater outside the offshore dam 17 and is provided with a suitable water inlet opening situated above the hydraulic pump 6. As can be seen, the hydraulic pump 6 is similar to that shown in the previous embodiment, while the duct 11 conveys the water delivered by this pump 6 to the turbine 16 and from here to a further recirculation duct 19. The water used in the turbine 16 enters into this recirculation duct 19 and may be used to decontaminate a section 20 of seawater inside the offshore dam 17, for example if this dam bounds a port zone where it is likely that there will be a certain stagnation of the water.

Figure 4:
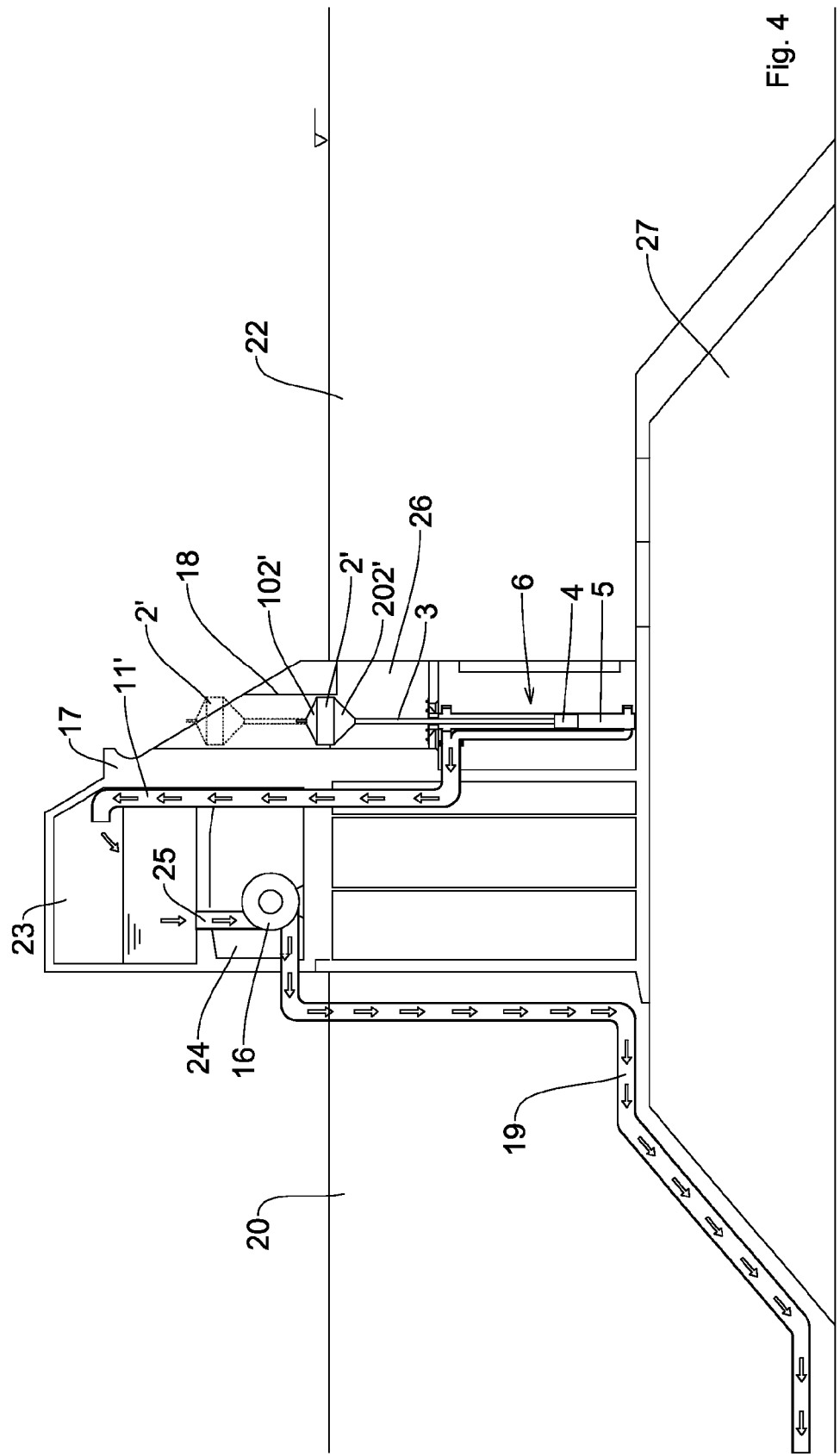
FIG. 4 shows a side elevation view of a variation of embodiment of the invention according to FIG. 3, in which the present plant comprises a tank for storing the water prior to entry into the turbine.

FIG. 4 shows a variant of the embodiment of the plant described above. In this variant the offshore dam 17 has, formed inside it, a tank 23 which receives, via the duct 11', the water drawn by the hydraulic pump 6 prior to its entry into the turbine 16. A chamber 24 is formed underneath this tank 23 and houses the turbine 16 which is connected to the alternator. This chamber 24 comprises at the top a duct 25 communicating with the tank 23, so as to be able to supply by means of gravity said turbine 16 with the water flowing into it. The seat 18 inside which the float 2' slides, as mentioned, is preferably cylindrical and has a constant internal radius; therefore the dam 17 comprises simply an inlet 26 for the water of the open-sea section 22. As can be seen, the offshore dam 17 rests on a rock base 27 and the duct 19 for recirculating the water used in the turbine passes along the section 20 of seawater inside the offshore dam 16 along the bottom thereof. In the figure the piston 4 and therefore the float 2' are shown substantially in their equilibrium position, namely when the float 2' is situated at the middle level of the seawater, from where it will move up on the crest of a sea wave as described with reference to FIG. 1 and then fall into the trough as described with reference to FIG. 2. The form of this float 2' is shown in broken lines in the case of very large waves and in this case the piston 4 will reach the upper end-of-travel position inside the cylinder 5.

Figure 5:
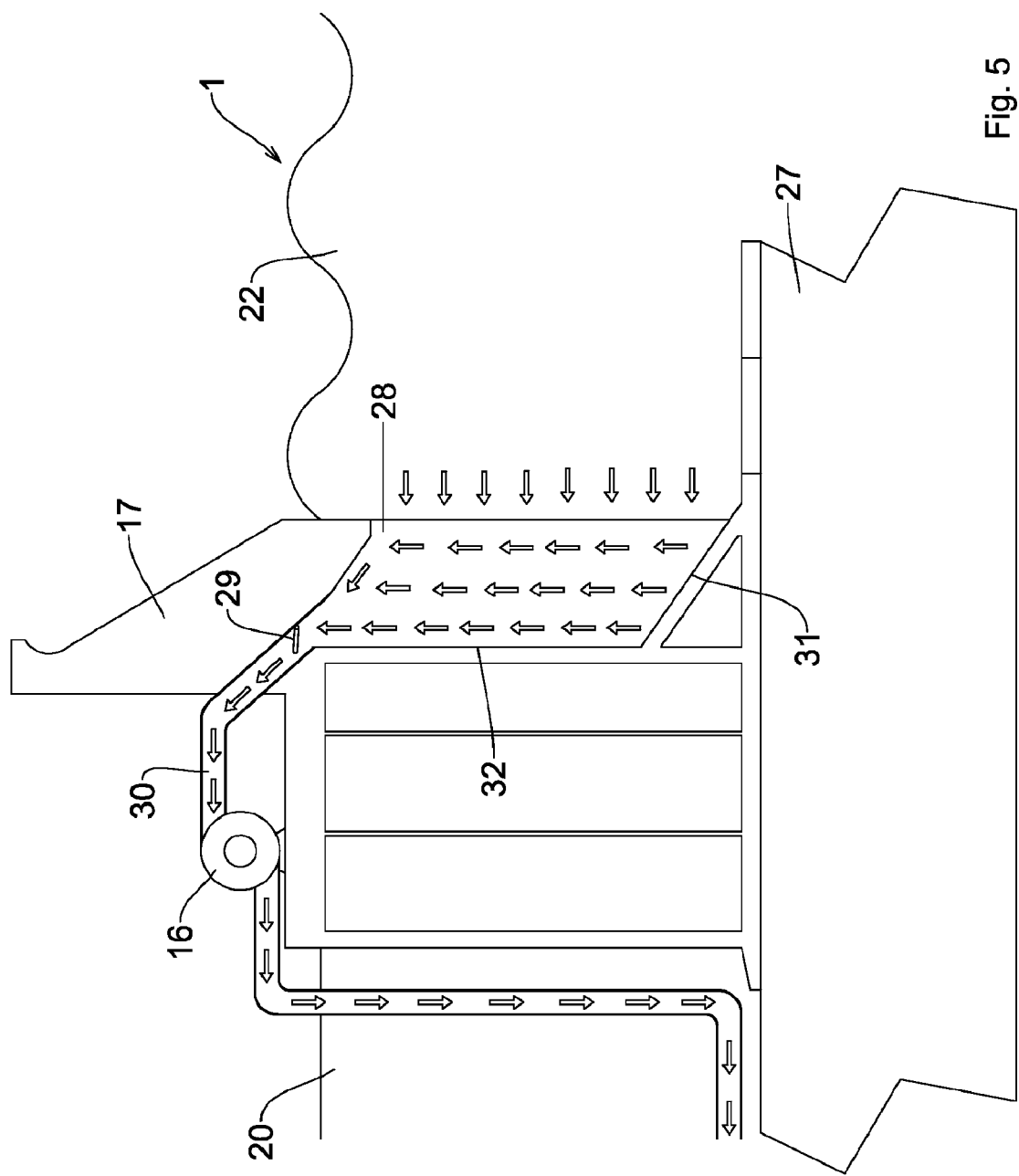
FIG. 5 shows a side elevation view of a further embodiment of the present plant, comprising an inlet formed in the offshore dam on the open-sea side and provided with a ramp sloping upwards.

FIG. 5 shows a further embodiment of the present invention. In this variant the offshore dam 17 has, formed therein, below the level of the open-sea section 22, an inlet 28 with an opening which is sufficiently wide and a water flow cross-section which suddenly narrows towards a non-return valve 29 which is situated substantially at the same level as the seawater and therefore on the top of this inlet 28. This inlet 28 comprises at the bottom a ramp 31 sloping upwards and a vertical wall 32 on one side. A duct 30 for supplying the water to the turbine 16 connected to the alternator is shown beyond the non-return valve 29. This turbine 16 directs the water towards the recirculating duct 19. The energy transported by the sea wave 1, upon encountering this sloping ramp 31 and the vertical wall 32 inside the dam 17, is projected upwards and together with the kinetic raising energy causes opening of the non-return valve 29, conveying water and compressed air into the duct 30 supplying the turbine 16.

Figure 6:
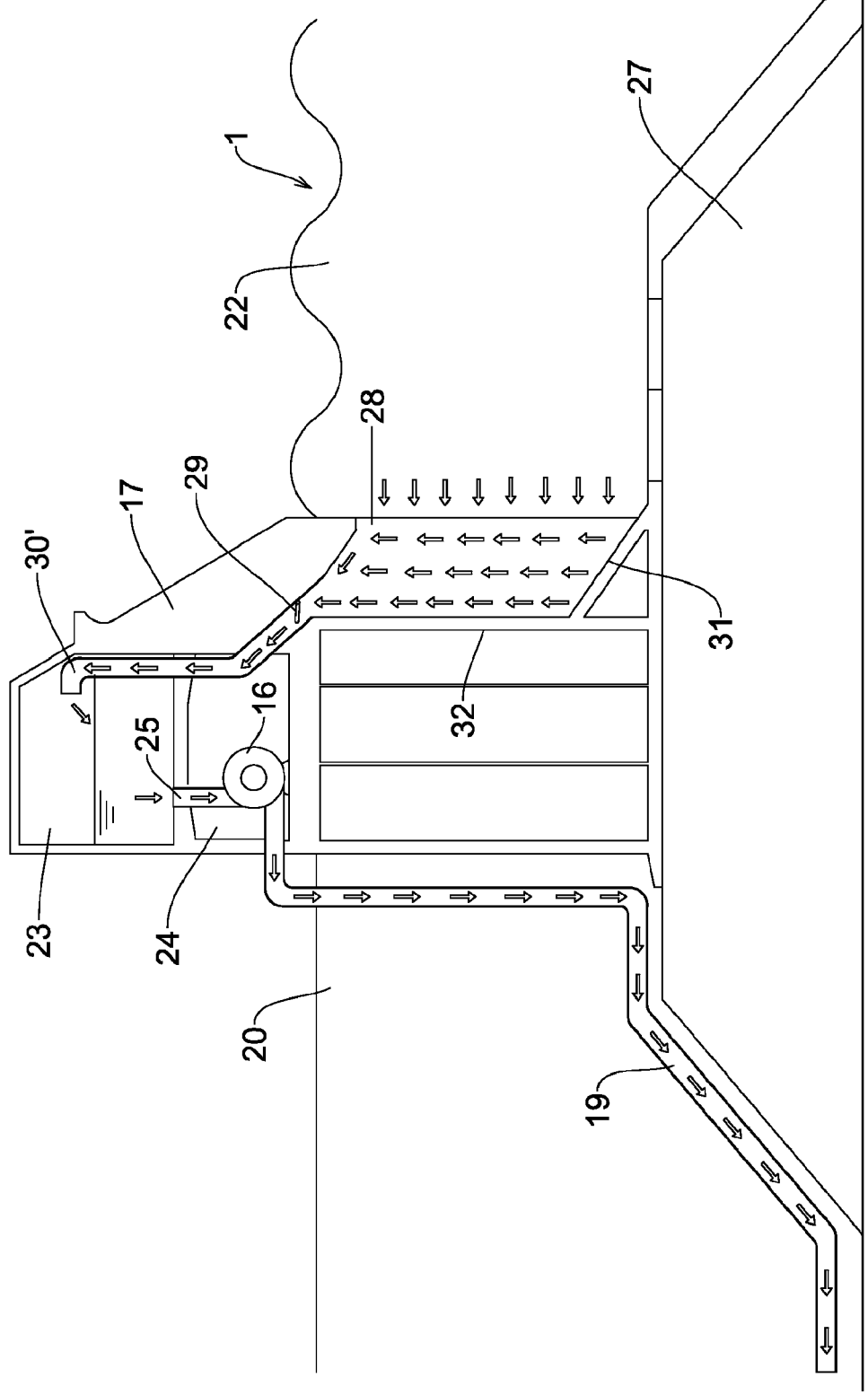
FIG. 6 shows an elevation view of a variation of embodiment of the plant according to FIG. 5.

FIG. 6 shows a variant of this embodiment described in which the duct 30' has a greater height and length than the duct according to FIG. 5 and conveys the water into the storage tank 23 provided at the bottom with the duct 25 which directs the water by means of gravity to the turbine 16.

Figure 7:
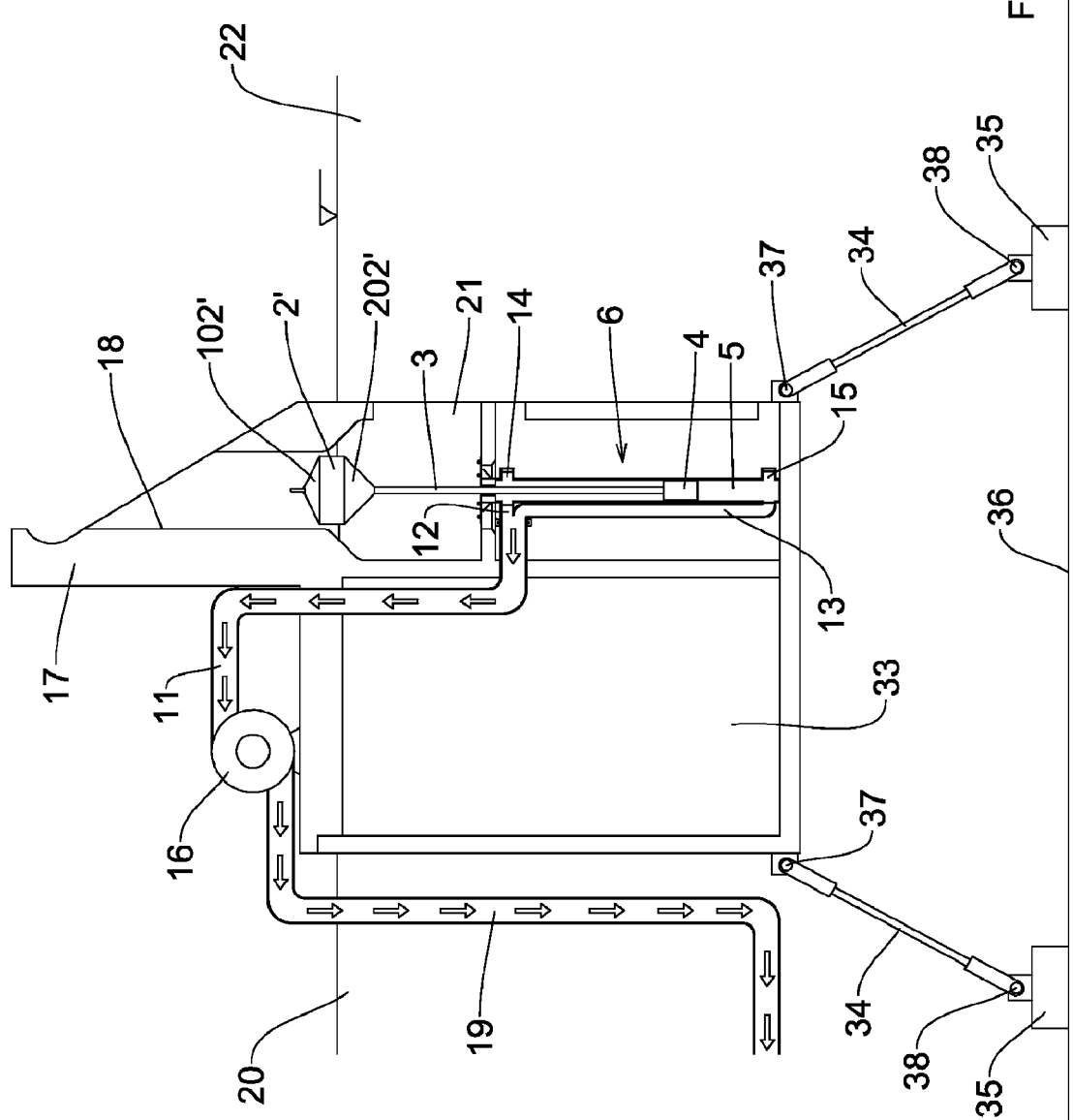
FIG. 7 shows a further embodiment of the invention according to which the plant is supported by a floating platform anchored to the sea bottom.

FIG. 7 shows a further embodiment of the invention. According to this embodiment the plant, which is similar to the plant described with reference to FIG. 3, is supported by a floating platform 33 anchored to the sea bottom 36 by means of for example 4 struts 34 hinged at one end at 37 to corners the base of the platform 33 at their other end at 38 to four anchor logs or sinkers 35.

Of course, the plant according to the invention can also be made in form of a prefabricated elements made from sheet metal or concrete, to be secured to the existing dams.

As can be seen from the above description there are numerous advantages which may be obtained by means of a plant for producing electric power from the movement of waves in accordance with the various embodiments of the invention shown by way of example, and numerous further variants may be adopted in order to achieve these advantages without departing from the scope of the accompanying claims.

The invention claimed is:

1. A plant for producing electrical power from the movement of waves, comprising:
   an offshore dam having a fixed generally vertical surface located in open water having wave movement and located vertically at the surface of the water where the waves would lap against it,
   a submerged part formed in and thus being an integral part of the dam and having an opening below the waves and in close proximity to the plane of the vertical surface for receiving the sea water and a one-way valve allowing the water entering the opening to pass through it,
   a force exerting structure also formed in and thus being an integral part of the dam for receiving the water entering the opening and forcing that water through the one-way valve, and
   a turbine in communication with the one-way valve for receiving the water which passes therethrough.

2. A plant according to claim 1, wherein the turbine is fixedly mounted with respect to the dam.

3. A plant according to claim 2, including a tank fixedly mounted relative to the dam, which tank has an inlet connected to the one-way valve to receive and store water passing through the one-way valve, the tank having an outlet in communication with the turbine for delivering water thereto.

4. A plant according to claim 3, wherein the outlet is positioned to deliver water downwardly by gravity to the turbine.

5. A plant according to claim 2, including a fluid line connected to an outlet of the turbine to recirculate the water.

6. A plant according to claim 1, wherein the turbine is located in a land zone at a distance from the dam.

7. A plant according to claim 1, wherein the force exerting structure comprises a hydraulic pump having a vertical cylinder, a piston mounted to reciprocate vertically in the cylinder and a float connected to the piston and movable vertically to follow the oscillations of the movement of the waves, the cylinder being in communication with the one one-way valve to force water out of the cylinder and through the one-way valve, upon such vertical movement of the piston.

8. A plant according to claim 7, said cylinder having near each end thereof on opposite sides of the piston a said one-way valve in communication with the turbine and a further one-way valve which comprises said opening for receiving sea water, whereby movement of the cylinder in each direction pushes water ahead of it through the said one-way valve to the turbine while permitting sea water to enter the cylinder behind the piston through a further one-way valve.

9. A plant according to claim 7, wherein said dam has fixed thereto a tubular seat in which said float is slidable vertically.

10. A plant according to claim 9, wherein the tubular seat is cylindrical.

11. A plant according to claim 10, wherein the float comprises an upper section and a lower section, each having a substantially conical or frustroconical shape so as to facilitate the rising and descending movement of the float.

12. A plant according to claim 10, including an expansion chamber entering the tubular seat above the said cylinder and below the float.

13. A plant according to claim 1, wherein said submerged part comprises a chamber with said opening in the form of a large inlet for receiving sea water, and said force exerting structure comprises an upwardly slanted bottom wall of the chamber and a vertical wall across from the inlet, the one-way valve being located at an upper part of the chamber, and the cross section of the chamber narrowing from said inlet toward said one-way valve.

14. A plant according to claim 1, including a floating platform anchored to the sea bottom, and said dam being supported on the platform.

15. A plant according to claim 14, including struts hinged to the platform to anchor the platform to the sea bottom.

16. A plant according to claim 15, wherein the struts are anchored to legs or sinkers on the sea bottom.

17. A plant according to claim 1, wherein the plant is made from prefabricated elements of sheet metal or concrete to be secured to existing dams.

18. A plant for producing electrical power from the movement of waves, comprising:
   an offshore dam having a fixed generally vertical surface located in open water having wave movement and located vertically at the surface of the water where the waves would lap against it,
   a submerged part fixed relative to the dam and having an opening below the waves and in close proximity to the plane of the vertical surface for receiving the sea water and a one-way valve allowing the water entering the opening to pass through it,
   a force exerting structure for receiving the water entering the opening and forcing that water through the one-way valve,
   a turbine in communication with the one-way valve for receiving the water which passes therethrough, and
   wherein said submerged part comprises a chamber with said opening in the form of a large inlet for receiving sea water, and said force exerting structure comprises an upwardly slanted bottom wall of the chamber and a vertical wall across from the inlet, the one-way valve being located at an upper part of the chamber, and the cross section of the chamber narrowing from said inlet toward said one-way valve.

19. A plant for producing electrical power from the movement of waves, comprising:
   an offshore dam having a fixed generally vertical surface located in open water having wave movement and located vertically at the surface of the water where the waves would lap against it,
   a submerged part fixed relative to the dam and having an opening below the waves and in close proximity to the plane of the vertical surface for receiving the sea water and a one-way valve allowing the water entering the opening to pass through it,
   a force exerting structure for receiving the water entering the opening and forcing that water through the one-way valve,
   a turbine in communication with the one-way valve for receiving the water which passes therethrough, and
   including a floating platform anchored to the sea bottom, and said dam being supported on the platform.

20. A plant according to claim 19, including struts hinged to the platform to anchor the platform to the sea bottom.

21. A plant according to claim 20, wherein the struts are anchored to legs or sinkers on the sea bottom.

* * * * *